US008181036B1

(12) United States Patent
Nachenberg

(10) Patent No.: US 8,181,036 B1
(45) Date of Patent: May 15, 2012

(54) EXTRUSION DETECTION OF OBFUSCATED CONTENT

(75) Inventor: Carey Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 1304 days.

(21) Appl. No.: 11/537,252

(22) Filed: Sep. 29, 2006

(51) Int. Cl.
 *H04L 29/06* (2006.01)
(52) U.S. Cl. ............ 713/189; 713/187; 726/13; 726/23; 726/30; 709/224; 709/225; 709/226; 709/232
(58) Field of Classification Search .................. 726/23
See application file for complete search history.

(56) References Cited

U.S. PATENT DOCUMENTS

| | | | | |
|---|---|---|---|---|
| 7,467,202 | B2* | 12/2008 | Savchuk | 709/224 |
| 7,516,492 | B1* | 4/2009 | Nisbet et al. | 726/27 |
| 2002/0129140 | A1* | 9/2002 | Peled et al. | 709/224 |
| 2005/0055399 | A1* | 3/2005 | Savchuk | 709/203 |
| 2005/0080898 | A1* | 4/2005 | Block | 709/225 |
| 2005/0273614 | A1* | 12/2005 | Ahuja et al. | 713/176 |
| 2006/0048224 | A1* | 3/2006 | Duncan et al. | 726/22 |
| 2006/0253445 | A1* | 11/2006 | Huang et al. | 707/9 |

OTHER PUBLICATIONS

Clayton, "Stopping Spam by Extrusion Detection," 2004, 8 pgs.*
Cui, W. et al., "Binder: An Extrusion-Based Break-In Detector for Personal Computers," 2005 USENIX Annual Technical Conference, pp. 363-366, [online] [Retrieved on Nov. 15, 2006] Retrieved from the Internet<URL:http://www.usenix.org/event/usenix05/tech/general/full_papers/short_papers/cui/cui.pdf#search=%22Extrusion%20detection%20symantec%22>.
"Enterprise IT Planet Product Guide—DataSafe (Fidelis Security Systems)," Jupitermedia Corporation, 2006, [online] [Retrieved on Nov. 15, 2006] Retrieved from the Internet<URL:http://products.enterpriseitplanet.com/security/fm/1118943979.html>.
"Fidelis Security Systems: News and Press," Fidelis Security Systems, Inc., Jan. 10, 2006, [online] [Retrieved on Nov. 15, 2006] Retrieved from the Internet<URL:http://www.fidelissecurity.com/news/index.php?news=38>.
Haase, M.S., "The Pipeline," Media Inc., Apr. 10, 2006, [online] [Retrieved on Nov. 15, 2006] Retrieved from the Internet<URL:http://www.fcw.com/artide92842-04-10-06-Print>.
Messmer, E., "Extrusion-Detection, the Plus and Minus," Networkworld, Mar. 6, 2006, [online] [Retrieved on Nov. 15, 2006] Retrieved from the Internet<URL:http://www.networkworld.com/weblogs/security/011369.html>.
"Red Hat Software Catalog Application Profile DataSafe 3.7," Red Hat, Inc., 2006 [online] [Retrieved on Nov. 15, 2006] Retrieved from the Internet<URL:https://www.redhat.com/apps/isv_catalog/AppProfile.html?application_id=2007>.

* cited by examiner

*Primary Examiner* — Thanhnga B Truong
*Assistant Examiner* — Thaddeus Plecha
(74) *Attorney, Agent, or Firm* — Fenwick & West LLP

(57) ABSTRACT

Techniques are disclosed that enable extrusion detection (i.e., outgoing confidential information from an enterprise or other entity). The techniques operate to detect outgoing confidential information at the gateway and/or the client, even if that confidential information is encrypted, compressed, or otherwise obfuscated before transmission (e.g., via email or to a portable storage media such as a memory stick).

17 Claims, 5 Drawing Sheets

EXTRUSION DETECTION OF OBFUSCATED CONTENT

FIELD OF THE INVENTION

The invention relates to computer and network security, and more particularly, to extrusion detection techniques that can see through encrypted and/or compressed outgoing content.

BACKGROUND OF THE INVENTION

Extrusion detection is a technology that promises to detect intentional and accidental data leakage from a corporation. Gateway-based extrusion detection software (EDS) products scan outgoing email, web, and IM traffic for confidential information and either alert or block if confidential information is transmitted outside the corporation. One problem with conventional gateway EDS systems is that they cannot scan compressed and/or encrypted files/content.

Therefore, if a determined attacker compresses and/or encrypts a file on his desktop before attaching it to an email, the EDS system will be unable to detect (when it scans the email at the gateway) that sensitive data is being leaked. Similarly, if a user encrypts a file before copying it to a thumb-drive, CD-ROM, or other such local media, conventional desktop EDS systems will be unable to detect that transfer of potentially sensitive data.

The current technique for addressing this issue is to simply block all encrypted/compressed files from leaving the gateway. This solution is problematic, as it incurs a high false positive rate and restricts legitimate outgoing encrypted/compressed content.

What is needed, therefore, are techniques that allow extrusion detection systems to detect and interrogate obfuscated content.

SUMMARY OF THE INVENTION

One embodiment of the present invention provides a computer implemented methodology for extrusion detection of obfuscated content. The method includes classifying files accessible by a computer as either sensitive or not sensitive, computing a signature of a file output by an obfuscation tool, and using the signature to prevent extrusion of obfuscated sensitive content. The method may further include monitoring events on the computer (including use of obfuscation tools to create obfuscated files), and determining if a file being opened by an obfuscation tool is classified as sensitive. In one particular case, only sensitive files output by obfuscation tools are subjected to the signature computing step. In another particular case, using the signature to prevent extrusion of obfuscated sensitive content includes sending the signature to a data leakage detection engine for use in extrusion detection. The extrusion detection can be carried out, for example, on the computer and/or a gateway proxy with which the computer is communicatively coupled (light-client and heavy-client principles can be used here, and the functionality can be distributed as desired). In another particular embodiment, the method may include monitoring for outgoing communications that include one or more attachments. In response to detecting an outgoing communication that includes an attachment, the method further includes extracting the attachment for analysis. In response to the analysis indicating an extrusion attempt, the method may include blocking the extrusion attempt. In one such embodiment, the attachment was obfuscated by more than one obfuscation process (e.g., encyrpted, compressed, and then encrypted again; or multiple compressions). In one particular such embodiment, the analysis includes computing a signature of the extracted attachment, and comparing that signature to signatures of known sensitive information. In response to the signature of the extracted attachment matching a signature of known sensitive information thereby indicating an extrusion attempt, the method continues with blocking the extrusion attempt.

Another embodiment of the present invention provides one or more machine-readable mediums (e.g., one or more compact disks, diskettes, servers, memory sticks, or hard drives, etc) encoded with instructions, that when executed by one or more processors, cause the processor to carry out a process for extrusion detection of obfuscated content. This process can be, for example, similar to or a variation of the previously described method.

Another embodiment of the present invention provides a system for extrusion detection of obfuscated content. The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. The system can be implemented in a client-server environment, with some extrusion detection functionality carried out, for example, at the server and some at the client, or all at the client. The client can be configured as heavy or light as desired, as will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques are disclosed that allow extrusion detection systems to detect and interrogate obfuscated content.

System Architecture

Figure 1:
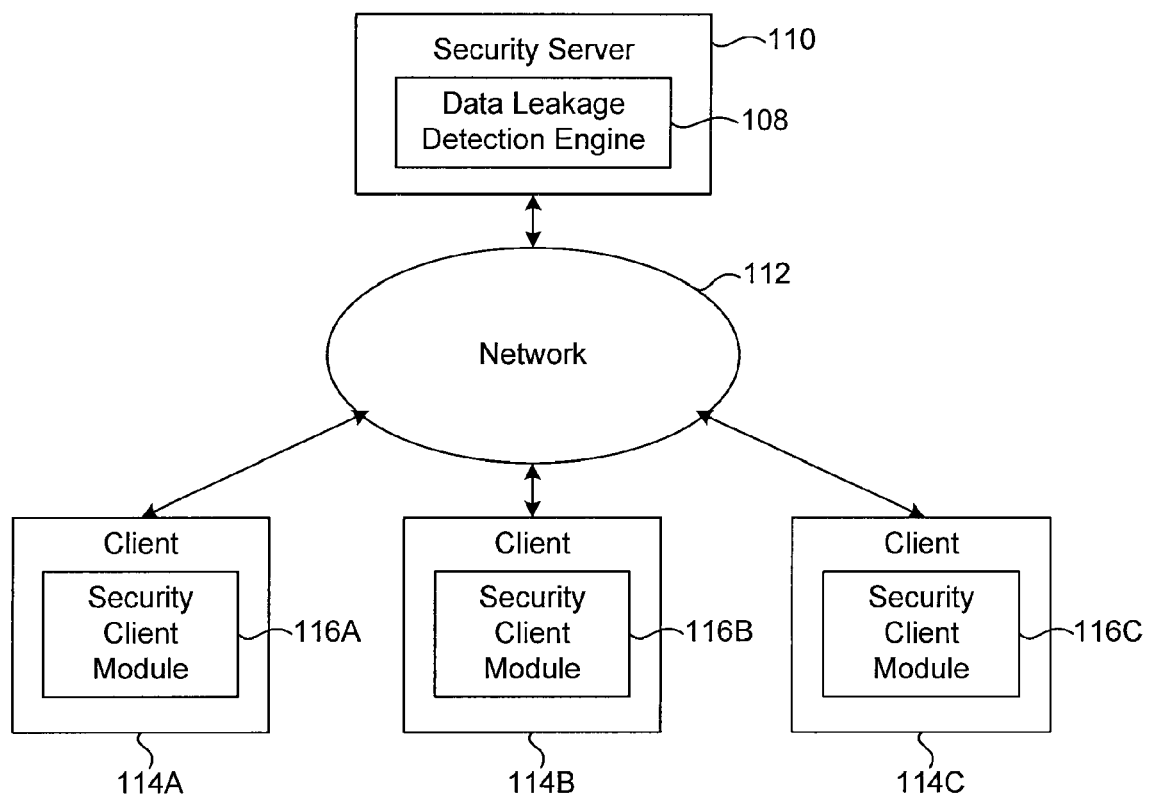
FIG. 1 is a block diagram of a computing environment configured in accordance with one embodiment of the present invention.

FIG. 1 is a block diagram of a computing environment configured in accordance with an embodiment of the present invention. As can be seen, the computing environment includes a security server 110 connected to a network 112. The security server 110 includes a data leakage detection engine 108. Also connected to the network 112 are one or more client computers 114, each of which includes a security client module 116. Alternative embodiments can be implemented within a single machine, such as within client 114 without interaction with server 110 (i.e., the data leakage engine 108 can also run on client 114).

The network 112 may be any type of communications network, such as a local area network (e.g., intranet), wide area network (e.g., Internet), or some combination thereof. Alternatively, the network 112 may be a direct connection between a client computer 114 and the security server 110. In general, the client computers 114, network 112, and/or the security server 110 may be in communication via any type of wired or wireless connection, using a wide variety of communication protocols (e.g., TCP/IP, HTTP, SMTP, FTP), encodings or formats (e.g., HTML, XML), and protection schemes (e.g., VPN, secure HTTP, SSL). Alternatively, the security server 110 may indirectly communicate with the client computer 114 via U.S. mail or other such delivery service, where a processor readable medium (e.g., compact disk or floppy disk) is sent to the address where one of the clients 114 is located. This processor readable medium can be encoded with instructions and/or data files that can be loaded, executed and/or otherwise used by the client 114.

The client computer 114 is a computing device that can have any number of applications, operating systems, etc. In one embodiment, the client computer 114 is a conventional computer system executing, for example, a Microsoft Windows-compatible operating system (OS), Apple OS, and/or a Linux distribution. In another embodiment, the client computer 114 is device having computer functionality, such as a personal digital assistant (PDA), cellular telephone, smartphone, video game system, etc. Such a client computer 114 typically has the capability to send messages (with one or more files attached) to external destinations (e.g., via email, text messages, instant messages, etc), as well the capability to receive such messages from external sources. Likewise, as a client computer 114 typically can access local and/or remote network locations (e.g., on network 112 or some other network) where potentially sensitive files (e.g., confidential or proprietary) are stored or are otherwise accessible. Although multiple client computers 114 are shown in FIG. 1, note that other embodiments may have only a single client (with or without a server). Likewise, note that other embodiments may have thousands or millions of such clients.

The security client module 116 executes on the client computer 114. In one particular embodiment, the security client module 116 is programmed or otherwise configured for classifying files as either sensitive or not sensitive, monitoring all reads and writes/creates to files on the system, and forwarding information obtained by the classification and file monitoring processes to the data leakage detection engine 108 (which may reside on the server/gateway or the client machine itself, as previously explained). With such functionality, and in accordance with one embodiment of the present invention, the security client module 116 can detect when an obfuscation tool (e.g., PGP, pkzip, crypt, etc) is launched on the client 114. If such an obfuscation tool opens or otherwise accesses a file that is known to contain confidential content (as determined by the classification process), then the resulting obfuscated file created by the obfuscation tool can be tracked. This tracking can be achieved, for example, by computing an obfuscated data hash (e.g., MD5) of the obfuscated file (output by the obfuscation tool). This hash or other signature is then forwarded to the server-side data leakage detection engine 108 for use during the extrusion detection process, as will be discussed in turn.

The security module 116 can be, for example, incorporated into the OS of the computer or part of a separate comprehensive security package. In one embodiment, the security client module 116 is provided by the entity that operates the security server 110. The security client module 116 may further be configured to communicate with the security server 110 via the network 112 in order to, for example, download code, signatures and/or other information utilized to detect and eradicate malicious software. The security client module 116 may also collect information regarding a potential information leak, and provide that information to the security server 110 for further evaluation. The security server 110 can then provide a recommendation to the security client module 116. The security client module 116 will be discussed in further detail with reference to FIGS. 2, 3 and 4.

The security server 110 is provided by a security product vender (e.g., software, appliances, and/or services) or other such entity. The security server 110 can be implemented as an email, HTTP, IM, or other such gateway proxy, and may include one or more computer systems configured to communicate with client computers 114 via the network 112. The server 110 may include, for example, a web proxy server, FTP proxy server, email proxy server, and/or other technology that enables the security server 110 to interact with the client computers 114 via the network 112.

In this embodiment, the data leakage detection engine 108 resides on the security server 110. The data leakage detection engine 108 can optionally reside on the client 114 (e.g., encoded within or otherwise in communication with module 116) to monitor file copies to thumb-drives and other local media used to export information. Note that such a client-side data leakage detection engine 108 can be used as an alternative to the server-side data leakage detection engine 108 or in addition to the server-side data leakage detection engine 108.

In any case, the data leakage detection engine 108 is programmed or otherwise configured to perform content filtering (extrusion detection). In more detail, and in accordance with one embodiment of the present invention, the data leakage detection engine 108 is configured to detect all outgoing attachments and to extract each attachment from its corresponding transmission (e.g., email, text messages, instant messages, HTTP, and any other such file transmission mechanisms) using conventional or custom extraction and file stripping techniques. For each extracted file, the data leakage detection engine 108 computes a signature (e.g., MD5, Rabin fingerprints or other suitable hash) for the file and compares this signature against signatures computed for obfuscated files on a client 114 (as will be discussed in turn). If the data leakage detection engine 108 detects the transmission of an encrypted/obfuscated file that is known to contain confidential information (e.g., based on the obfuscated data hash computed on client 114), then that extrusion attempt can be successfully blocked at the gateway.

The security server 110 may be configured with other functionality as well. For instance, server 110 may provide signatures and code to the client computers 114, for detecting malicious software including malware executables or executables infected with malware.

Figure 2:
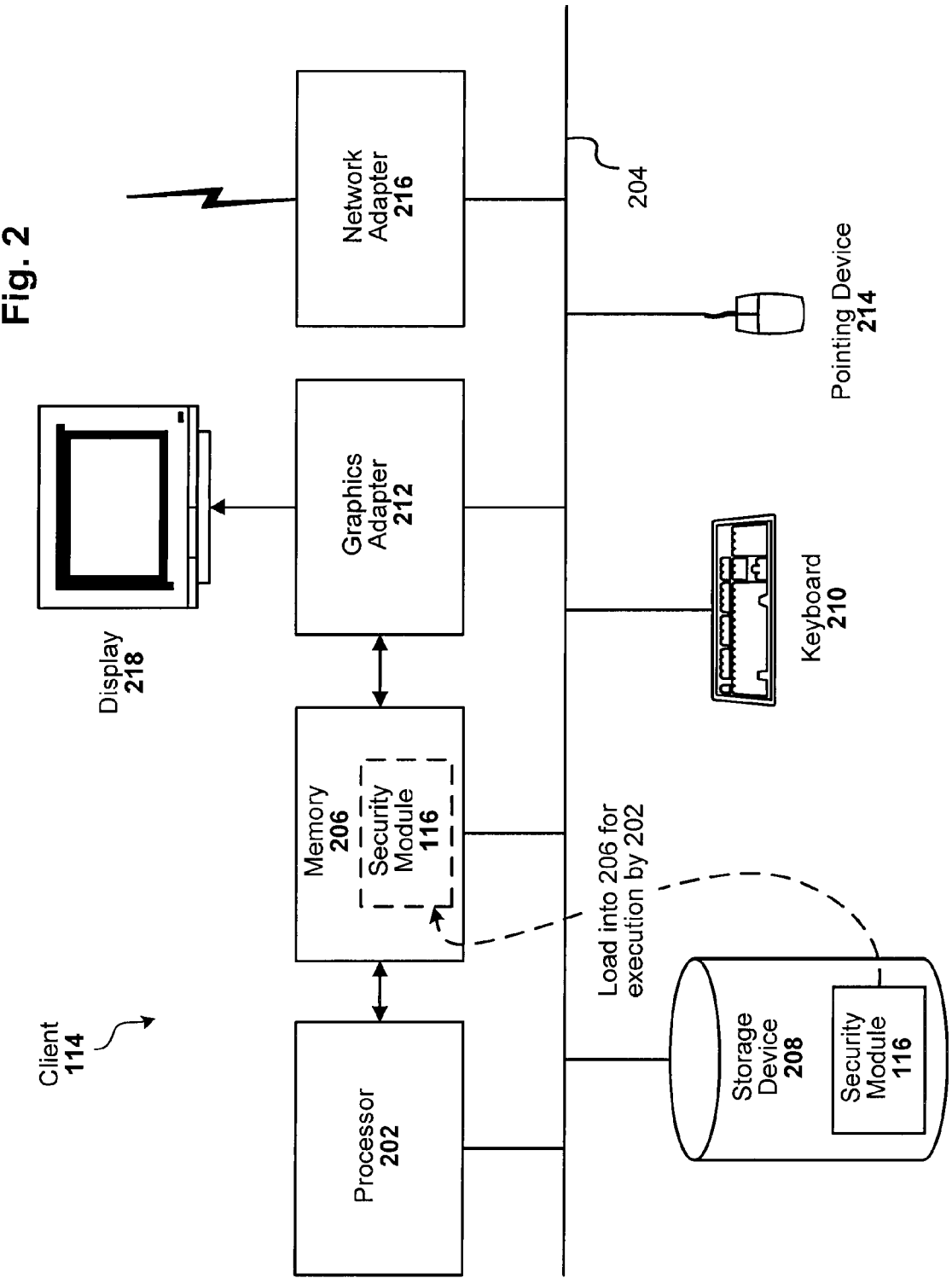
FIG. 2 is a block diagram illustrating a functional view of a client computer 114 configured in accordance with an embodiment of the present invention.

FIG. 2 is a block diagram illustrating a functional view of a client computer 114 configured in accordance with an embodiment of the present invention. As can be seen with this example, the client computer 114 includes a processor 202 operatively coupled via a bus 204 to a memory 206, a storage device 208, a keyboard 210, a graphics adapter 212, a pointing device 214, and a network adapter 216. A display 218 is operatively coupled to the graphics adapter 212.

The processor 202 may be any CPU or other processor that is capable of executing the various operating systems, applications/drivers, and other executable content of the client computer 114. Numerous suitable processors (e.g., Intel Pentium and AMD K processors) will be apparent in light of this disclosure. The memory 206 may be, for example, firmware ROM, RAM, and/or flash memory, and holds instructions and data used by the processor 202. The storage device 208 is a hard disk drive in one embodiment, but can also be any other device capable of persistently storing data, such as a writeable compact disk or DVD, and/or a solid-state memory device. The storage device 208 can hold multiple files (e.g., both confidential and non-confidential), executable code, and/or data, as is typically done. The computer 114 can load an executable file into memory 206 and execute it using the processor 202. An executable file that is loaded into memory 206 for execution is referred to as a "process." The file on the storage device 208 from which the process was loaded is said to "host" the process. In the example embodiment shown in FIG. 2, the security module 116 is stored in storage device 208, and is loaded into memory 206 for execution by the processor 202.

The files stored on the storage device 208 can be, for example, in any suitable format and may be informational files (e.g., text files, spreadsheets, image files, audio files, video files, drawing files, .HTM files, .INI files, .HTML files, to name a few) and/or executable files (e.g., .EXE, .DLL, .BIN files to name a few). Various file formats, such as those utilized by Microsoft, Apple Macintosh and Linux-based computers are applicable here.

The pointing device 214 may be a mouse, track ball, or other such user input device, and is used in combination with the keyboard 210 to input data into the computer 114, as is typically done. The graphics adapter 212 displays images and other information on the display 218. The network adapter 216 communicatively couples the computer 114 with the network 112 (e.g., via conventional wired or wireless technology, as is typically done).

The computer 114 is adapted to execute computer program modules for providing protective functionality described herein, including extrusion detection of obfuscated content and mitigation. In this particular example, the term "module" refers to computer program logic for providing the specified functionality. Note, however, that other modules configured in accordance with the principles of the present invention can be implemented in hardware, firmware, software, or some combination thereof. It will be understood in light of this disclosure that the modules described herein represent one embodiment of the present invention. Certain embodiments may include other and/or different modules and functionality. In addition, the embodiments may lack modules described herein and/or distribute the described functionality among the modules in a different manner. In one embodiment, the modules are stored on the storage device 208 as executable files, loaded into the memory 206, and executed by the processor 202 as one or more processes.

Security Module

Figure 3:
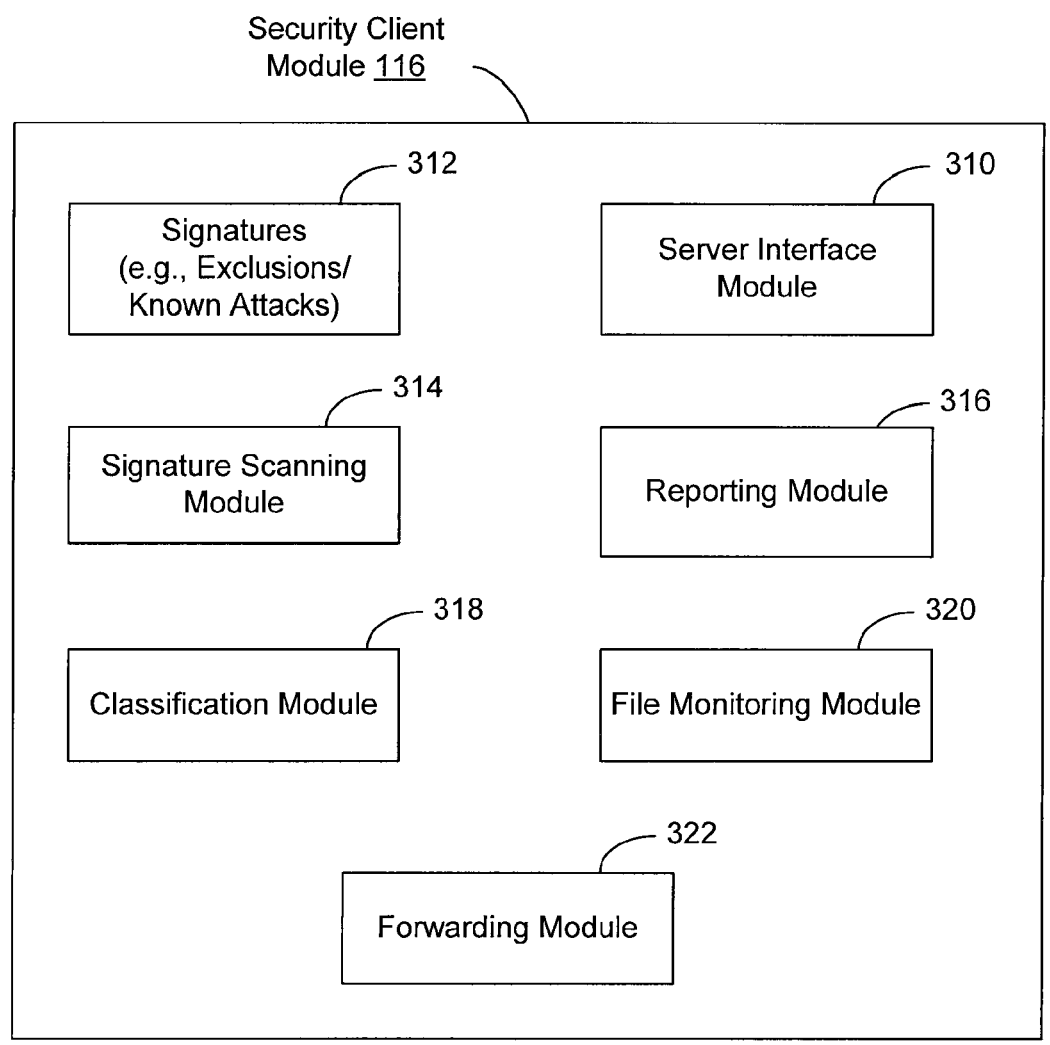
FIG. 3 is a block diagram illustrating modules within a security client module configured in accordance with an embodiment of the present invention.

FIG. 3 is a block diagram illustrating modules within the security client module 116 configured in accordance with an embodiment of the present invention. As can be seen, the security client module 116 includes a server interface module 310, signature database 312, a signature scanning module 314, a reporting module 316, a classification module 318, a file monitoring module 320, and a forwarding module 322. As previously explained, each of these components can be implemented in software that executes on a processor of a client computer. However, other embodiments (e.g., hardware logic or a combination of hardware and software) can be implemented as well, as previously explained. Numerous configurations will be apparent in light of this disclosure.

The server interface module 310 enables communication between the security client module 116 and the security server 110 via the network 112. It may also be programmed or otherwise configured to send and receive information from processes on the local machine 114, or from other devices on the network 112. In one embodiment, the server interface module 310 retrieves security files from the server 110, such as signatures of known malicious software and exclusions. The security client module 216 may also provide suspect host files to the server 110 (e.g., for security analysis or quarantine) via the server interface module 310. Once module 310 receives security data (e.g., signatures and exclusions) from server 110, it updates the signature database 312 accordingly.

The signatures database 312 stores signatures of exclusions. Exclusions are trusted programs, routines, applications, etc that are known to legitimately perform certain actions. The signatures database 312 can also be configured to store signatures for identifying known malicious software on the client computer 114, including rootkits, viruses, and other known malware and security threats. In one embodiment, the signatures in the signatures database 312 contain strings, instruction usage records and/or other data that can be used to uniquely identify specific types of malicious software (or trusted software for purposes of exclusion from security processing). For example, a signature can contain a specific sequence of values that are found in only a particular virus. If a file stored on a client computer 114 has the sequence of values, then that file is infected with the virus. The signatures are typically designed to be utilized with executable files, such as those in the WINDOWS PE format, and with other types and formats of files that might contain malicious software.

The signature scanning module 314 is programmed or otherwise configured to scan files stored (e.g., on RAM, ROM, or disk drive) in client 114 for the presence of the signatures in the signatures database 312. In one embodiment, the signature scanning module 314 analyzes a file to identify its potential entry points and other locations likely to contain malicious software. The module 314 scans these likely locations to determine whether they contain a signature included in the signatures database 312. The signature scanning module 314 can also perform additional analysis of files, such as emulating instructions of a file within a virtual machine and then scanning the memory of the virtual machine for matching signatures (a form of sandboxing).

The reporting module 316 is programmed or otherwise configured to provide a user interface that informs the user of security events, such as the detection of viruses, intrusions and actions taken. In one particular embodiment, the reporting module 316 presents notification (e.g., received from server 110 via network and server interface module 310) to the user that an extrusion attempt was detected and stopped. Note, however, that no reporting is necessary, in that detected malware, extrusion attempts, and other activity could be silently detected and resolved. In addition, module 316 can also be configured to collect information about newly detected threats and submit them to an analysis agent, such as a remote security response center (e.g., via the server interface module 310 and network 112). The collected information could include, for example, the functional profile of the threat (e.g., what it did to the client computer and how) and/or samples of suspect code.

The classification module 318 is programmed or otherwise configured to classify files stored on the client 114 as either sensitive or not sensitive (or some variation thereof, such as confidential/proprietary or not confidential/proprietary). This classification can be done in the background, and/or in real-time as files are modified, added, created, etc. This determination can be made using a number of well-known techniques, such as keyword searches (e.g., search for "Confidential", "Proprietary", "Not for Circulation", "Customer List", "projected sales", "upcoming merger", "stock buy back proposal", "Secret" or variations thereof, code words (e.g., "Project X") indicating a classified project, and other such words/phrases indicative of sensitive or otherwise in appropriate information), Bayesian networks or other such probabilistic graphical models, Latent Symantec Indexing and other such natural language processing techniques, etc. Alternatively, or in addition to, various file types can be associated with a predefined classification (e.g., all audio files such as .WAV are considered proprietary; all spread sheet files such as .XLS are considered proprietary). In one particular embodiment, policies are provided or otherwise supplemented (e.g., by the administrator and/or security vendor) that specify what content keywords are confidential. The content keywords can include, for example, a set of pre-defined or "stock" words/phrases as well as user-specified words/phrases. Functionality of the classification module 318 will be discussed in more detail with reference to FIGS. 4a-b.

The classification module 318 may be further configured to identify files having an unclear classification, and to send those files to a remote security response center (e.g., via the server interface module 310 and network 112) for review. The response center can then reply back to the classification module 318 with an appropriate classification. For instance, if the word "merger" appears in a document, than that document can be flagged and forwarded for review to determine the nature of the document (e.g., is the document discussing an upcoming merger that is not yet public information, or is it discussing a previous merger that is now-public information?). To this end, classification module 318 may be further configured to interrogate a document to glean the context in which targeted words/phrases are used. For instance, the module 318 can search for the date to establish a time frame, a department or person's name to establish what group or people are involved, an external street address to establish where the communication may have previously been sent, etc.

The classification module 318 may be further configured to apply or otherwise adjust classifications based on timing. For instance, documents with the code word "Project X" can be restricted to a classified or sensitive status until after the public release date of the product/service. Once the release date has come and the product/service has successfully launched, the documents can be reclassified to be not sensitive, if so desired. Variations on such temporal sensitivity will be apparent in light of this disclosure.

The file monitoring module 320 is programmed or otherwise configured to monitor (e.g., based on kernel-mode Symevent drivers) all reads and writes/creates to files on the system. For example, module 320 can detect in real-time when an application A attempts to open a file F, and/or create a file G, in accordance with an embodiment of the present invention. For instance, application A may be an obfuscation tool, such as a compression and/or encryption algorithm, and file F can be a confidential file, and file G is the compressed/encrypted version of file F. Similarly, application A may be a word processing tool, and file F can be a confidential file, and file G is a "save as" copy of file F. Similarly, application A may be a media player, and file F can be a confidential media file (e.g., audio and/or video), and file G is a "save as" copy of file F. Functionality of the file monitoring module 320 will be discussed in more detail with reference to FIGS. 4a-b.

The forwarding module 322 is programmed or otherwise configured to forward information obtained by the classification module 318 and file monitoring module 320 to the data leakage detection engine 108 (which may reside on the gateway or the client machine itself). Note that the forwarding module 322 is shown as a distinct module for purposes of explanation. However, variations will be apparent from this disclosure. For instance, functionality of the forwarding module 322 could be integrated into the reporting module 316 (which then communicates with the server interface module 310). Alternatively, functionality of the forwarding module 322 could be integrated directly into the server interface module 310. Functionality of the file forwarding module 322 will be discussed in more detail with reference to FIGS. 4a-b.

In operation, and in accordance with an embodiment of the present invention, all files (e.g., documents, spreadsheets, etc) on a protected desktop system are classified using the classification module 318, giving them a rating of either "confidential" or "not-confidential" (or equivalent thereof). The file monitoring module 320 has a set of MD5-hashes or other signatures provided by the security vendor that uniquely identify encryption, compression, and other such obfuscation programs, like PGP, pkzip, crypt, etc. As the file monitoring module 320 observes the user launching programs on the client computer 114, it determines if a launched program is a known obfuscation tool based on these signatures (e.g. by comparing signatures of launched programs with signatures of known obfuscation programs). If such an obfuscation tool opens a file that is known to contain confidential content (e.g., as determined by the classification module 318), then the file or files created by the obfuscation tool are tracked, until the tool terminates. In general, and in accordance with one embodiment of the present invention, if the file monitoring module 320 detects that an obfuscation tool has been launched, and that the obfuscation tool is opening a file with confidential information, and the obfuscation tool is creating an output file, then the assumption is that the user is obfuscating a confidential input file and generating an obfuscated output file. Once the newly-created obfuscated file is closed by the obfuscation tool, the file monitoring module 320 computes a unique signature (e.g., MD5 data hash or other suitable signature) of the obfuscated output file and passes this hash to the forwarding module 322. Similarly, if an obfuscation tool opens a file that is known to contain obfuscated sensitive data (i.e., a sensitive file that has already been encrypted one or more times), then the file monitoring module 320 can also be configured to compute a hash or other unique signature for the multi-obfuscated file created by the obfuscation tool. This allows for the detection of files that are, for example, PGPed, ZIPped, and PGPed again (or other multiple obfuscation schemes), and provides transitive closure across all versions of a confidential file. In any such cases, the forwarding module 322 forwards all such obfuscated data signatures (e.g., hashes) to the server-side components (e.g., data leakage detection engine 108) to perform content filtering, as previously discussed.

Methodology

Figure 4A:
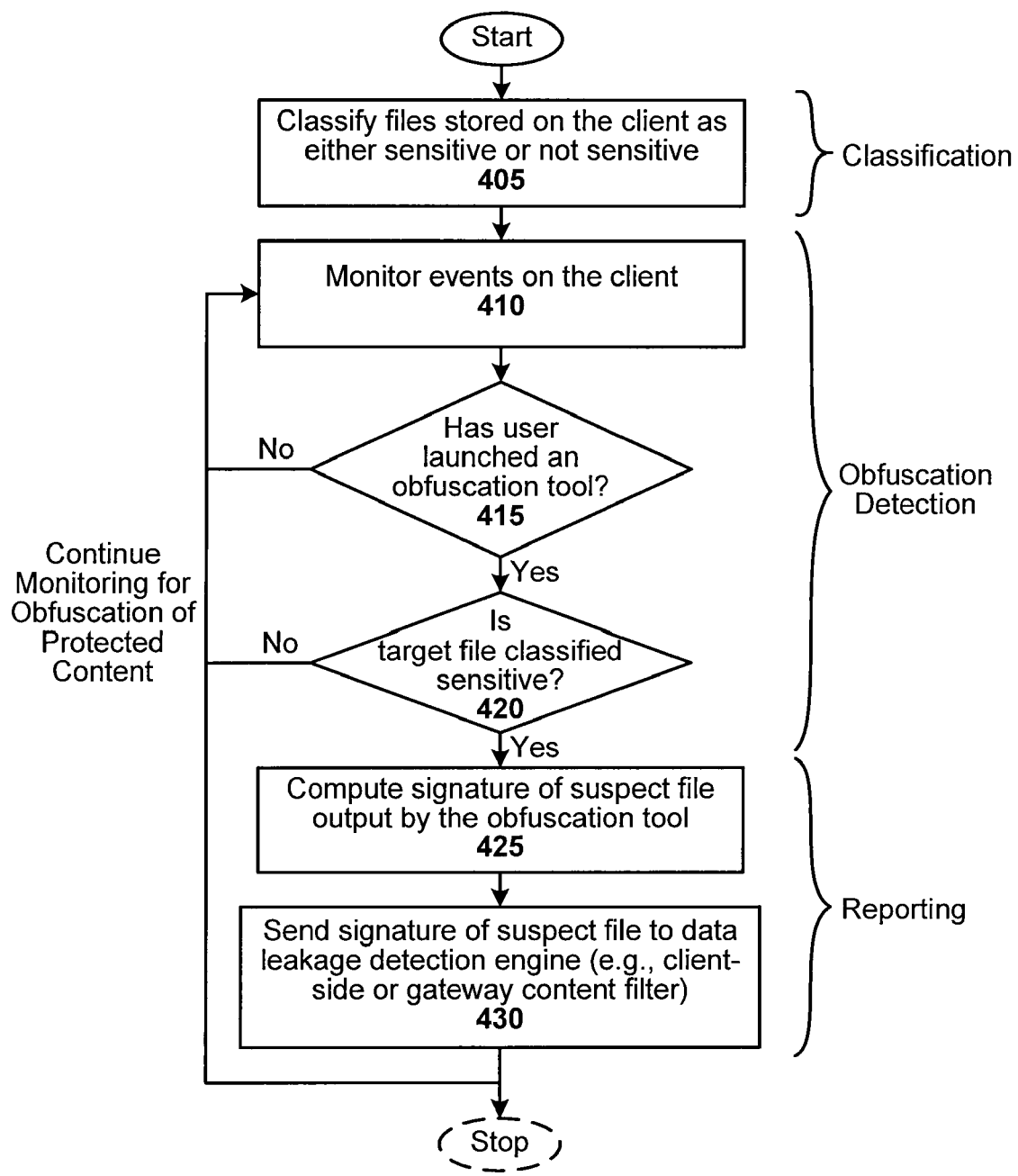
FIGS. 4a and 4b illustrate a method for extrusion detection of obfuscated content, in accordance with one embodiment of the present invention.
Figure 4B:
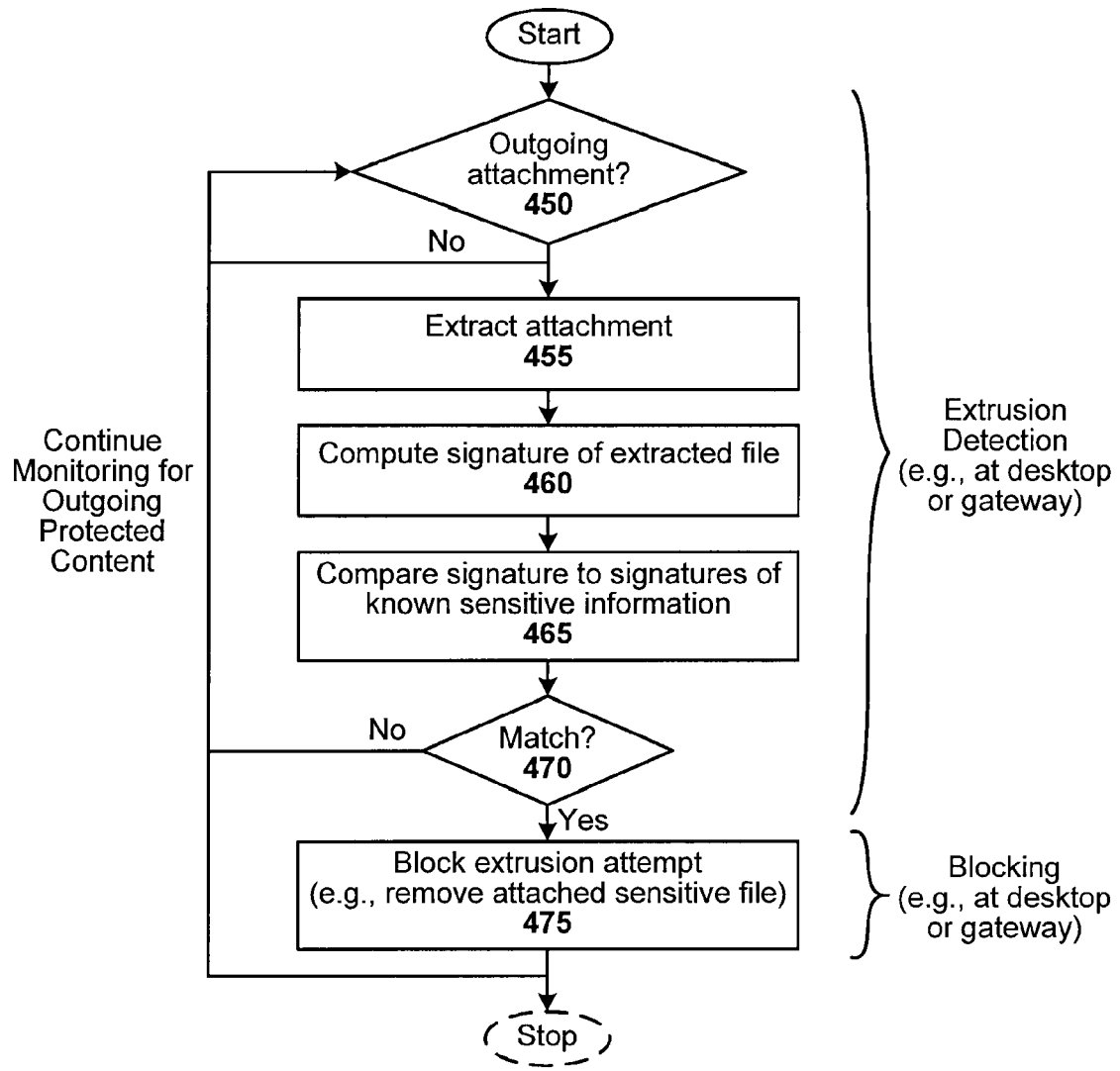

FIGS. 4a and 4b illustrate a method for extrusion detection of obfuscated content, in accordance with one embodiment of the present invention. The method can be carried out, for example, by the system shown in FIG. 1, and/or by the client security module 116 shown in FIG. 3. As previously explained, modules for carrying out the method functionality can be implemented as executable code (e.g., C, C++, or other suitable object code) encoded on one or more machine-readable mediums, in accordance with one particular embodiment.

The method includes classifying 405 files stored on the client as either sensitive or not sensitive. As previously indicated, this classification process can be carried out in the background, or in real-time as files are created, added, copied, etc. The method continues with monitoring 410 events on the client, including the use of obfuscation tools to create obfuscated files. The method continues with determining 415 whether the user has launched an obfuscation tool. In one particular case, this is achieved by monitoring for launched programs having signatures (e.g., MD5) that match signatures of known obfuscation tools, as previously explained. Alternatively, or in addition to, this determination can be achieved by monitoring the name of executables. For instance, "WINZIP.EXE" is a known executable of a compression application. Alternatively, or in addition to, the obfuscation tools available to the user can be programmed or otherwise configured to issue an event or other indicator to inform the method that such a tool is being launched. Alternatively, all unknown programs that operate on an input file that has been classified as sensitive, and produce an output file, can be considered defacto obfuscation programs, and the output file can be processed as described herein (thereby ensuring new or unknown obfuscation programs are not overlooked or otherwise able to defeat the system).

If the user has not launched an obfuscation tool, then the method continues with monitoring for obfuscation of protected content. Otherwise, the method continues with determining 420 if the target file being opened by the obfuscation tool is classified as sensitive (e.g., confidential, etc). If not, then the method continues monitoring for obfuscation of protected content. If, on the other hand, the target file being opened by the obfuscation tool is classified, then the method continues with computing 425 a signature (e.g., MD5 or other suitable identifier) of suspect file output by the obfuscation tool, and sending 430 that signature to a data leakage detection engine (e.g., which can be implemented as a client-side or gateway content filter). The method continues monitoring for obfuscation of protected content.

The methodology thus far includes classifying, detecting obfuscation of protected content, and reporting that obfuscation. As can be seen with reference to FIG. 4b, the method of this embodiment further includes detecting transmission of obfuscation/protected content and blocking that content from leaving the secure area, which may be, for example, an enterprise network or a stand-alone computer, as previously explained The method includes determining 450 if an outgoing communication (e.g., email, instant message, text message, etc) includes an attachment, which could be any type of file. If not, the method continues with monitoring for outgoing communications. However, if an outgoing communication does include one or more attachments, then the method includes extracting 455 the attachment for analysis. In this particular embodiment, the analysis includes computing 460 a signature (e.g., MD5 or other suitable identifier) for each extracted file, and comparing the signature to signatures of known sensitive information.

The method continues with determining 470 if the signature of the suspect file matches a signature of known sensitive information. If not, then the method continues to monitoring for outgoing communications including protected content. On the other hand, if the signature of the suspect file does match a signature of known sensitive information, then the method continues with blocking 475 the extrusion attempt (e.g., remove attached sensitive file or block entire communication). The method continues monitoring for outgoing protected content.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method for detecting extrusion of obfuscated content, comprising:
   comparing signatures of programs launched on a computer with signatures of known obfuscation tools;
   detecting launching of an obfuscation tool on the computer responsive to a signature of a program launched on the computer matching a signature of a known obfuscation tool;
   responsive to detecting launching of the obfuscation tool, determining if a file being opened by the obfuscation tool is classified as sensitive, the determining comprising:
      determining if the file contains a word/phrase indicative of sensitive information;
      responsive to determining that the file contains the word/phrase indicative of sensitive information, interrogating the file to glean a context in which the word/phrase is used; and
      determining whether the file is classified as sensitive responsive to results of the interrogation;
   responsive to a determination that the file being opened by the obfuscation tool is classified as sensitive, determining that the obfuscation tool produces an output file and classifying the output file as sensitive;
   computing a signature of the output file; and
   using the signature of the output file to prevent extrusion of obfuscated sensitive content within the output file.

2. The method of claim 1 wherein using the signature to prevent extrusion of obfuscated sensitive content within the output file comprises:
   sending the signature of the output file to a data leakage detection engine for use in extrusion detection.

3. The method of claim 2 wherein the extrusion detection is carried out on at least one of the computer or a gateway proxy with which the computer is communicatively coupled.

4. The method of claim 1 further comprising:
   monitoring for outgoing communications that include one or more attachments; and
   in response to detecting an outgoing communication that includes an attachment, extracting the attachment for analysis.

5. The method of claim 4 wherein the analysis comprises:
   computing a signature of the extracted attachment;
   comparing that signature to signatures of known sensitive information; and
   in response to the signature of the extracted attachment matching a signature of known sensitive information thereby indicating an extrusion attempt, blocking the extrusion attempt.

6. The method of claim 4 wherein in response to the analysis indicating an extrusion attempt, the method further comprises:
   blocking the extrusion attempt.

7. One or more non-transitory machine-readable mediums encoded with instructions, that when executed by one or more processors, cause the processor to carry out a process for detecting extrusion of obfuscated content, the process comprising:

comparing signatures of programs launched on a computer with signatures of known obfuscation tools;

detecting launching of an obfuscation tool on the computer responsive to a signature of a program launched on the computer matching a signature of a known obfuscation tool;

responsive to detecting launching of the obfuscation tool, determining if a file being opened by the obfuscation tool is classified as sensitive, the determining comprising:

determining if the file contains a word/phrase indicative of sensitive information;

responsive to determining that the file contains the word/phrase indicative of sensitive information, interrogating the file to glean a context in which the word/phrase is used; and determining whether the file is classified as sensitive responsive to results of the interrogation;

responsive to a determination that the file being opened by the obfuscation tool is classified as sensitive, determining that the obfuscation tool produces an output file and classifying the output file as sensitive;

computing a signature of the output file; and using the signature of the output file to prevent extrusion of obfuscated sensitive content within the output file.

8. The one or more non-transitory machine-readable mediums of claim 7 wherein using the signature to prevent extrusion of obfuscated sensitive content within the output file comprises:

sending the signature of the output file to a data leakage detection engine for use in extrusion detection.

9. The one or more non-transitory machine-readable mediums of claim 8 wherein the extrusion detection is carried out on at least one of the computer or a gateway proxy with which the computer is communicatively coupled.

10. The one or more non-transitory machine-readable mediums of claim 7, the process further comprising:

monitoring for outgoing communications that include one or more attachments; and in response to detecting an outgoing communication that includes an attachment, extracting the attachment for analysis.

11. The one or more non-transitory machine-readable mediums of claim 10 wherein the analysis comprises:

computing a signature of the extracted attachment;

comparing that signature to signatures of known sensitive information; and in response to the signature of the extracted attachment matching a signature of known sensitive information thereby indicating an extrusion attempt, blocking the extrusion attempt.

12. The one or more non-transitory machine-readable mediums of claim 10 wherein in response to the analysis indicating an extrusion attempt, the process further comprises:

blocking the extrusion attempt.

13. A system for detecting extrusion of obfuscated content, comprising:

a non-transitory machine-readable medium encoded with processor-executable instructions comprising:

a monitoring module for comparing signatures of programs launched on a computer with signatures of known obfuscation tools and for detecting launching of an obfuscation tool on the computer responsive to a signature of a program launched on the computer matching a signature of a known obfuscation tool;

a classifier module for, responsive to a detected launch of the obfuscation tool, determining if a file being opened by the obfuscation tool is classified as sensitive, the determining comprising:

determining if the file contains a word/phrase indicative of sensitive information;

responsive to determining that the file contains the word/phrase indicative of sensitive information, interrogating the file to glean a context in which the word/phrase is used; and determining whether the file is classified as sensitive responsive to results of the interrogation;

the monitoring module further for, responsive to a determination that the file being opened by the obfuscation tool is classified as sensitive, determining that the obfuscation tool produces an output file, for classifying the output file as sensitive, and for computing a signature of the output file; and a data leakage detection engine for using the signature of the output file to prevent extrusion of obfuscated sensitive content within the output file; and a processor for executing the instructions encoded on the non-transitory machine-readable medium.

14. The system of claim 13 further comprising:

a forwarding module for sending the signature of the output file to the data leakage detection engine for use in extrusion detection;

wherein the extrusion detection is carried out on at least one of the computer or a gateway proxy with which the computer is communicatively coupled.

15. The method of claim 1, wherein determining if a file being opened by the obfuscation tool is classified as sensitive comprises:

determining whether the file being opened is known to contain obfuscated sensitive data.

16. The method of claim 1, wherein determining if a file being opened by the obfuscation tool is classified as sensitive comprises:

sending the file to a remote security response center; and receiving, from the remote security response center, a classification for the file.

17. The method of claim 1, wherein determining if a file being opened by the obfuscation tool is classified as sensitive comprises:

analyzing a classification of the file being opened based at least in part on a temporal sensitivity of the file.

\* \* \* \* \*